J. G. WARTHER.
CASKET HANDLE.
APPLICATION FILED MAR. 17, 1911.

1,044,312.

Patented Nov. 12, 1912.
2 SHEETS—SHEET 1.

Witnesses:

Inventor:
Joseph G. Warther,
by John Elias Jones,
Attorney.

J. G. WARTHER.
CASKET HANDLE.
APPLICATION FILED MAR. 17, 1911.
1,044,312.
Patented Nov. 12, 1912.
2 SHEETS—SHEET 2.
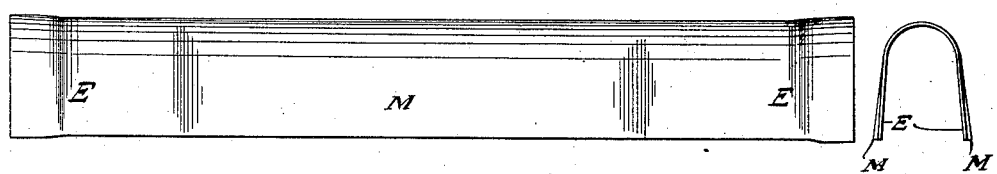 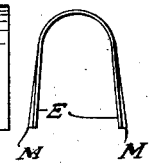
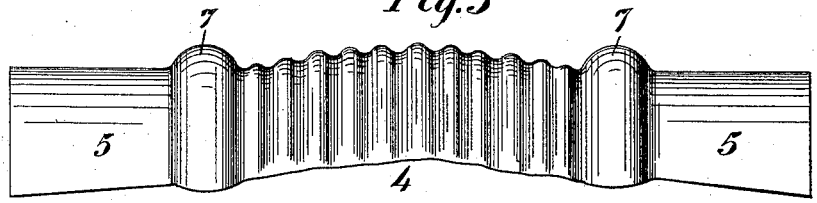 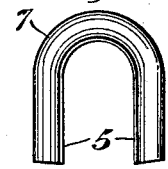
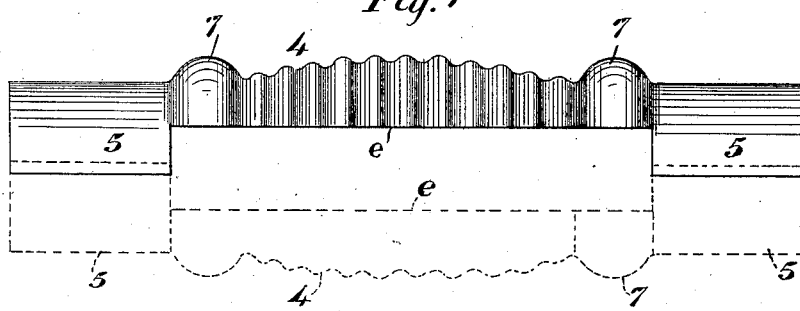 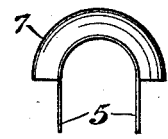
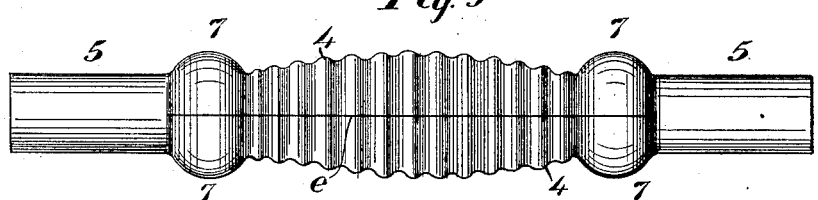
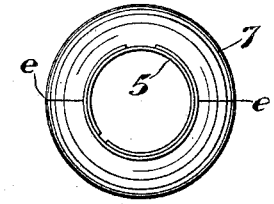

UNITED STATES PATENT OFFICE.

JOSEPH G. WARTHER, OF CINCINNATI, OHIO, ASSIGNOR TO THE CRANE & BREED MANUFACTURING COMPANY, OF CINCINNATI, OHIO, A CORPORATION OF OHIO.

CASKET-HANDLE.

1,044,312.      Specification of Letters Patent.      Patented Nov. 12, 1912.

Application filed March 17, 1911. Serial No. 614,997.

*To all whom it may concern:*

Be it known that I, JOSEPH G. WARTHER, a citizen of the United States of America, and a resident of Cincinnati, in the county of Hamilton and State of Ohio, have invented a certain new and useful Improvement in Casket-Handles, of which the following is a specification.

The invention relates to hollow, sheet-metal casket-handles and the method of making the same.

The type of handles referred to herein is that in which the grip portion thereof is composed of a pair of corresponding parts or sections that are longitudinally interlocked and are suitably supported in the pendent hanger-arms on the sides of the casket.

The object of the invention herein, however, is to provide a handle composed of two corresponding longitudinally-disposed sections that are not overlapped in the grip portions thereof but extend longitudinally from said grip portions into bearing or supporting portions, the latter portions being made to overlap in a circular or winding manner so as to give them strength and to dispose of the use of cores within the grip and the handle-bar and, also, being adapted to engage the respective openings or eyes in the outer ends of the pendent hanger-arms of the socket-plates and, also, being adapted to carry at their opposite ends the ornamental tip-members common to handle-bars.

My invention thus consists of certain features of construction and the method of producing and assembling same, such as will be fully described hereinafter and particularly pointed out in the claims.

Figure 1:
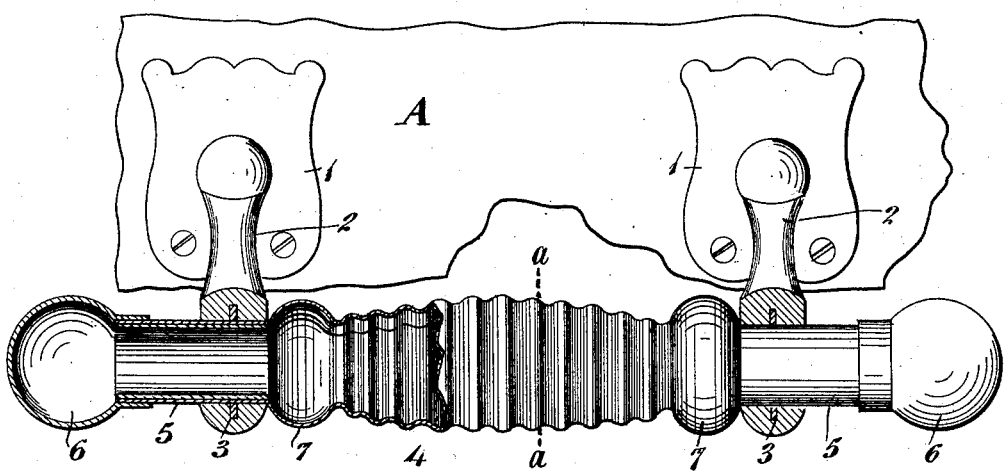
Figure 2:
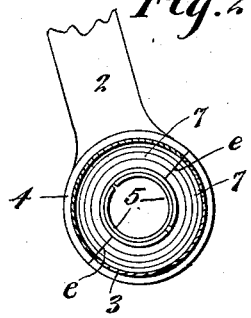

In the accompanying several sheets of drawings, Figure 1 is a front elevation showing my invention as it appears in use in connection with a pair of socket-plates and pendent hanger-arms, the latter being shown in cross-section at their lower eye-ends and the left-hand end of the grip and bar portions of the handle, together with the tip, being shown in section; Fig. 2, a broken off lower end of one of the pendent hanger-arms, showing supported therein one end of my improved handle, the latter being shown in transverse sectional elevation taken on the dotted-line *a, a* of Fig. 1, but omitting the socket-plate; Fig. 3, a longitudinal elevation of the plain blank of sheet-metal from which the device herein is formed, showing the initial bend or first step in the operation or method of constructing my device; Fig. 4, an end view of Fig. 3; Fig. 5, a longitudinal elevation showing the second step in said operation; Fig. 6, an end view of Fig. 5; Fig. 7, a longitudinal elevation showing the third step in said operation; Fig. 8, an end view of Fig. 7; Fig. 9, a longitudinal elevation showing the fourth or last step in the said operation, with the two longitudinal sections or members thereof now in full interlocking condition; and Fig. 10, an end view, on a somewhat slightly larger scale, of Fig. 9.

1 indicates each one of the pair of plates or socket members of any suitable design and attached, the desired distance apart, to the side A of a casket or other object requiring a handle of the type herein.

2 indicates the several pendent swinging arms on said socket-plates and having handle supporting or bearing eyes or openings 3 at their lower ends, as customary.

4 indicates the grip portion of the handle and 5, 5 the longitudinally-extending opposite ends of said grip-member, adapted to form integral bearing ends or supports for the latter.

6, 6 indicate ornamental balls or tips secured to the outer ends of the bearing or supporting extensions 5 of the handle.

The several portions thus far described in detail in connection with the handle itself are all hollow ones, which, in use heretofore, have had to be supplied with an internal, longitudinal, strengthening and stiffening core of wood or the like. The device as herein constructed is of ample strength to dispense with the use of such cores.

In some of the several views of the drawings, I have shown the grip 4 as being made of corrugated or fluted form and gradually swelled toward the center thereof and I have shown, also, bead or swelled portions 7 in the metal between the corrugated portions of the grip and the extended supporting or bearing ends 5, such bead parts 7 forming suitable shoulders for engagement with the eyes 3 of the arms 2 and preventing the longitudinal movement of the handle in said arms.

In the method of making my structure, the sheet-metal in the grip and bead portions does not overlap but the oppositely-extended supporting or bearing ends 5 overlap in a circular or coil manner, to give them great strength and the proper circular form for engagement in the eyes 3 at the lower ends of the pendent arms 2.

The method used in making my device herein is carried on in the following manner:—A rectangular blank of sheet-metal is bent into U-shape cross-section, as shown in Fig. 4, with the opposite ends of the sheet approaching slightly closer together than the main or middle portion of the sheet, such main or middle portion being designated by the letter M and such opposite ends being designated by the letter E; the bent blank is then placed between dies and given the shape seen in Fig. 5, with the corrugated grip portion 4, bearing portions 5, and swelled portions 7; the metal in the blank is then removed or cut away in said grip and swelled portions to a suitable depth and terminating with the supporting or bearing portions, as shown in Fig. 7, the dotted-lines in such Fig. 7 showing the companion or corresponding blank that must next be coupled with the already similarly-shaped blank; and then the two corresponding previously shaped blanks are closed together, so that the longitudinal edges e, e approach each other into intimate closing or abutting contact and the adjacent supporting ends or extensions 5, that now lap each other, are wound or coiled into circular form over a suitable mandrel. The adjacent or contiguous edges e, e of the grip portion of the handle may be brazed or soldered together to more intimately or securely close the butt-joint if desired, but, ordinarily, such soldering will not be necessary, especially if the cutting or trimming of the said edges e, e is smooth and true. In placing and securing the handle in the hanger-arms 2, 2, the jointed edges e, e lie at an angle or inclination of about sixty degrees, as shown in Fig. 2, so that said joints will not show conspicuously from the side of the casket.

I claim:—

1. A hollow casket-handle comprising two corresponding sheet-metal longitudinal members each being bent into suitable form and each having an intermediate grip or body portion whose inner edge abuts or contacts with that of the companion member and integral, oppositely-extended end bearing portions, each of the latter having laterally-disposed interwinding portions.

2. A hollow sheet-metal casket-handle comprising two longitudinal members each bent into approximately U-shape form in cross-section and having central or grip portions whose inner edges abut each other, and integral, oppositely-extended end portions that lap and wind within each other into circular or tubular form and are adapted to engage the pendent hanger-arms of the socket-plates of a casket.

3. A hollow casket-handle composed of two corresponding sheet-metal longitudinal members each being bent into approximately U-shape or semi-circular cross-section and having a corrugated and swelled middle or grip portion, bead or swelled portions integral with the opposite ends of said grip portion, with the inner edges of said grip and swelled portions abutting each other and oppositely-extended, integral end portions lapping and winding within each other and adapted to form supporting portions and adapted, further, to support ornamental tips.

JOSEPH G. WARTHER.

Witnesses:
MICHAEL F. DAVORAN,
JOHN ELIAS JONES.

---

Copies of this patent may be obtained for five cents each, by addressing the "Commissioner of Patents, Washington, D. C."